(No Model.)

D. W. LONG & H. H. WALSH.
SPINNING TOP.

No. 525,788. Patented Sept. 11, 1894.

Witnesses.
A. Ruppert.
G. B. Towles

Inventors.
Daniel W. Long,
Harry H. Walsh,
Per
Thomas P. Simpson,
atty.

UNITED STATES PATENT OFFICE.

DANIEL W. LONG AND HARRY H. WALSH, OF LOCKPORT, ILLINOIS.

SPINNING-TOP.

SPECIFICATION forming part of Letters Patent No. 525,788, dated September 11, 1894.

Application filed May 18, 1894. Serial No. 511,705. (No model.)

*To all whom it may concern:*

Be it known that we, DANIEL W. LONG and HARRY H. WALSH, citizens of the United States, residing at Lockport, in the county of Will and State of Illinois, have invented certain new and useful Improvements in Spinning-Tops; and we do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a spinning top which will first whirl rapidly in a horizontal position, then assume a vertical one, and finally conclude its gyrations in a horizontal position.

Figure 1:
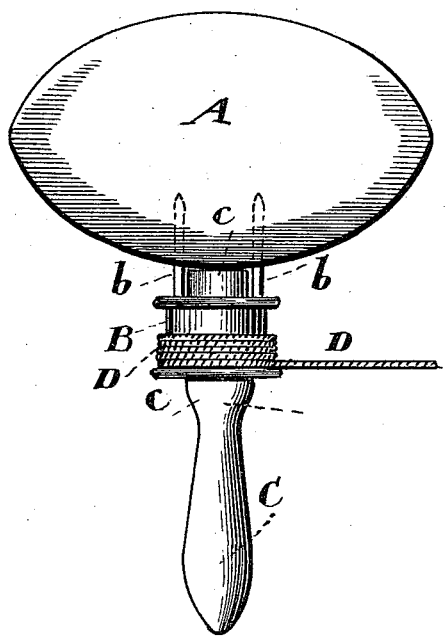
Figure 2:
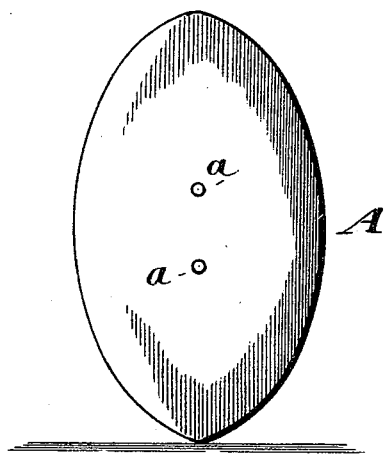
Figure 3:
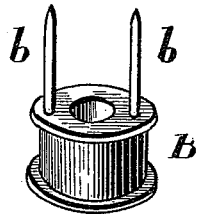
Figure 4:
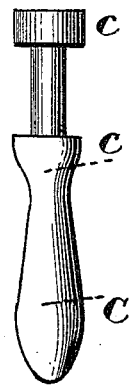

Figure 1 of the drawings is a side elevation, showing the top in a horizontal position with the spinner attached and ready for operation; Fig. 2, an elevation, showing the top in a vertical position or upon one of its ends; Fig. 3, a detail view of the spool or pulley with its prongs, and Fig. 4 a detail view of the spinner handle.

In the drawings, A represents the top which is made in the shape of a prolate spheroid, either solid or hollow and slightly heavier at one end than at the other. At the middle are formed two holes *a a*, one of which may be on each side of the major or minor axis. In the holes *a a* fit the two prongs *b b* placed diametrically opposite to each other on the side of a pulley or spool B which has a bearing between the collars *c c* of the handle C.

D is a cord which is wound up on the pulley, the whole shown in Fig. 1 of the drawings ready for operation. The top may be of wood, metal or any other suitable substance or material.

The handle being in a vertical position and held by one hand, the other is employed to pull the cord quickly and rotate the spool rapidly. This causes the spheroidal body to whirl about its minor axis with great velocity. It then assumes a vertical position, and whirls about its major axis. After a time, it again returns to a horizontal position where it remains until its motion ceases entirely.

The top changes from its minor to its major axis according to a law of matter, which is that a mass of matter caused to rotate about any center of motion will, under favorable conditions, find a center of motion around which its matter is most uniformly distributed. Our top is a prolate spheroid to be rotated above and in contact with a smooth, resistant surface.

By careful experiments, we have provided the conditions necessary for and favorable to the changes of position previously set forth. Repeated trials have demonstrated that our top, properly handled, will do exactly what we claim for it, in every instance, while a slight change will impair or destroy its peculiar properties.

Having thus described all that is necessary to a full understanding of our invention, what we claim as new, and desire to protect by Letters Patent, is—

A spheroidal top slightly heavier at one end than at the other with two holes in the plane of one axis and equally distant from the intersection of the two, in combination with a handle, a loose spool on said handle, two prongs on the side of the spool and a cord or string adapted to wind on and to be unwound from the spool, substantially as shown and for the purpose set forth.

In testimony whereof we affix our signatures in presence of two witnesses.

DANIEL W. LONG.
    HARRY H. WALSH.

Witnesses:
 O. W. MOORE,
 PETER WOLLESEN.